(12) United States Patent
Campbell et al.

(10) Patent No.: US 7,360,425 B2
(45) Date of Patent: Apr. 22, 2008

(54) COMPENSATED COMPOSITE STRUCTURE

(75) Inventors: Ray F. Campbell, Newport Beach, CA (US); Joan D. Wada, Anaheim, CA (US); Michael J. Costello, Hermosa Beach, CA (US); Mohsen A. Khatiblou, Laguna Hills, CA (US)

(73) Assignee: The Boeing Company, Chicago, IL (US)

( * ) Notice: Subject to any disclaimer, the term of this patent is extended or adjusted under 35 U.S.C. 154(b) by 358 days.

(21) Appl. No.: 10/994,848

(22) Filed: Nov. 22, 2004

(65) Prior Publication Data
US 2006/0111798 A1   May 25, 2006

(51) Int. Cl.
*G01P 15/125* (2006.01)
(52) U.S. Cl. .................................. 73/514.32
(58) Field of Classification Search ............ 73/514.32, 73/514.17, 514.18, 514.36, 514.38, 514.29
See application file for complete search history.

(56) References Cited

U.S. PATENT DOCUMENTS

| 2,696,566 A | 12/1954 | Lion |
| 2,711,590 A | 6/1955 | Wilcox |
| 3,186,101 A | 6/1965 | Wolpert |
| 3,226,981 A | 1/1966 | Mullins et al. |
| 3,290,786 A | 12/1966 | Parkin |
| 3,417,626 A | 12/1968 | Riordan |
| 3,746,281 A | 7/1973 | Stripling |
| 4,470,562 A | 9/1984 | Hall et al. |
| 4,507,737 A | 3/1985 | LaSarge et al. |
| 4,583,296 A | 4/1986 | Dell'Acqua |
| 4,601,206 A | 7/1986 | Watson |
| 4,792,676 A | 12/1988 | Hojo et al. |
| 4,912,397 A | 3/1990 | Gale et al. |
| 4,987,779 A | 1/1991 | McBrien |
| 5,008,774 A | 4/1991 | Bullis et al. |
| 5,031,330 A | 7/1991 | Stuart |
| 5,079,847 A | 1/1992 | Swartz et al. |
| 5,124,938 A | 6/1992 | Algrain |
| 5,146,417 A | 9/1992 | Watson |
| 5,180,986 A | 1/1993 | Swartz et al. |
| 5,191,713 A | 3/1993 | Alger et al. |
| 5,283,528 A | 2/1994 | van Seeters |
| 5,325,065 A | 6/1994 | Bennett et al. |
| 5,383,363 A | 1/1995 | Kulmaczewski |
| 5,415,040 A | 5/1995 | Nottmeyer |
| 5,417,312 A * | 5/1995 | Tsuchitani et al. ...... 188/181 A |
| 5,454,266 A | 10/1995 | Chevroulet et al. |
| 5,456,111 A | 10/1995 | Hulsing, II |

(Continued)

FOREIGN PATENT DOCUMENTS

EP    585862 A1    3/1994

(Continued)

*Primary Examiner*—Helen Kwok
(74) *Attorney, Agent, or Firm*—Ostrager Chong Flaherty & Broitman P.C.

(57) ABSTRACT

A method for constructing a compensated composite structure, including a support tube coupled to a flexure plate and enclosing a capacitor plate, includes selecting a material for the support tube whereby the coefficient of expansion is larger than that of the material of the capacitor plates. Further, the method includes selecting the lengths of the support tube and the capacitor plate such that the composite structure is insensitive to changes in temperature.

32 Claims, 4 Drawing Sheets

U.S. PATENT DOCUMENTS

| | | | |
|---|---|---|---|
| 5,461,319 | A | 10/1995 | Peters |
| 5,495,414 | A | 2/1996 | Spangler et al. |
| 5,597,956 | A | 1/1997 | Ito et al. |
| 5,644,083 | A * | 7/1997 | Newell et al. ............ 73/514.29 |
| 5,774,996 | A | 7/1998 | Ogawa et al. |
| 5,801,309 | A | 9/1998 | Carr et al. |
| 5,801,313 | A | 9/1998 | Horibata et al. |
| 5,831,164 | A | 11/1998 | Reddi et al. |
| 5,861,754 | A | 1/1999 | Ueno et al. |
| 5,905,203 | A | 5/1999 | Flach et al. |
| 5,969,250 | A | 10/1999 | Greiff |
| 5,986,497 | A | 11/1999 | Tsugai |
| 6,105,427 | A * | 8/2000 | Stewart et al. ............ 73/514.32 |
| 6,128,955 | A | 10/2000 | Mimura |
| 6,230,566 | B1 | 5/2001 | Lee et al. |
| 6,293,148 | B1 | 9/2001 | Wang et al. |
| 6,338,199 | B1 | 1/2002 | Chigira et al. |
| 6,449,857 | B1 | 9/2002 | Anikolenko |
| 6,467,346 | B1 | 10/2002 | Challoner et al. |
| 6,609,037 | B1 | 8/2003 | Bless et al. |
| 6,622,647 | B2 | 9/2003 | DePoy |
| 6,662,654 | B2 | 12/2003 | Miao et al. |
| 6,688,013 | B2 | 2/2004 | Greway |
| 6,701,788 | B2 | 3/2004 | Babala |
| 6,731,121 | B1 | 5/2004 | Hsu et al. |
| 6,776,043 | B1 * | 8/2004 | Campbell et al. ........ 73/514.32 |
| 6,785,975 | B1 | 9/2004 | Campbell et al. |
| 6,810,739 | B1 * | 11/2004 | Campbell et al. ........ 73/514.01 |
| 7,107,845 | B2 * | 9/2006 | Wada ...................... 73/514.32 |
| 2002/0005297 | A1 | 1/2002 | Alft et al. |
| 2002/0190607 | A1 | 12/2002 | Padden et al. |
| 2003/0079543 | A1 | 5/2003 | Potter |

FOREIGN PATENT DOCUMENTS

JP     06082469 A     3/1994

* cited by examiner

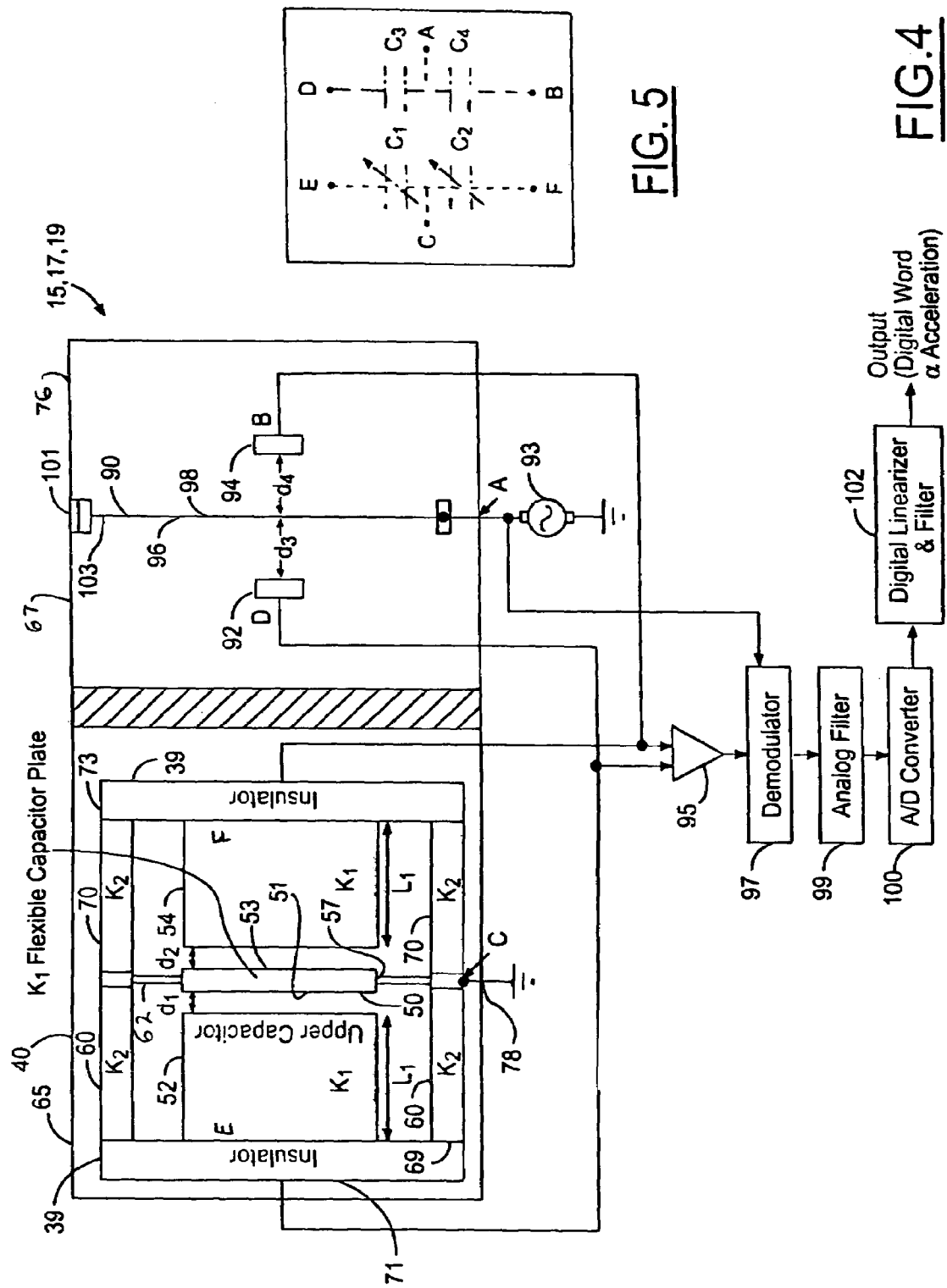

COMPENSATED COMPOSITE STRUCTURE

TECHNICAL FIELD

The present invention relates generally to accelerometers, and more particularly, to a compensated composite structure for a flexure accelerometer device.

BACKGROUND ART

Current systems, such as missiles, spacecraft, airplanes and automobiles, include inertial regulating systems or inertial measurement units for orienting the systems relative to the earth. Many inertial measurement units include accelerometers, such as capacitive accelerometers, for determining system inertia. It is well known that capacitive accelerometers measure the acceleration, vibration and the inclination of objects to which they are attached. In general, capacitive accelerometers change electrical capacitance in response to acceleration forces and vary the output of an energized circuit. Capacitive accelerometer systems generally include sensing elements, including capacitors, oscillators, and detection circuits.

The sensing elements include at least two parallel plate capacitors functioning in differential modes. The parallel plate capacitors generally operate in sensing circuits and alter the peak voltage generated by oscillators when the attached object undergoes acceleration.

When subject to a fixed or constant acceleration, the capacitance value is also a constant, resulting in a measurement signal proportional to uniform acceleration.

As was mentioned, this type of accelerometer can be used in aerospace inertial measurement units or in a portion of an aircraft or spacecraft navigation or guidance system. Accordingly, the temperature in the operating environment of the accelerometer changes over a wide range. Consequently, acceleration must be measured with a high accuracy over a wide range of temperatures and temperature gradients. This is often a difficult process.

Additionally, missile systems require a high degree of accuracy regarding angular and linear acceleration measurements. Improvements in this regard are constantly being sought out.

The disadvantages associated with current accelerometer systems have made it apparent that a new accelerometer system is needed. The new accelerometer system should substantially minimize temperature sensing requirements and should also improve acceleration detection accuracy. The present invention is directed to these ends.

SUMMARY OF THE INVENTION

In accordance with one aspect of the present invention, a method for constructing a compensated composite structure, including a support tube coupled to a flexure plate and enclosing a capacitor plate, includes selecting a material for the support tube whereby the coefficient of expansion is larger than that of the material of the capacitor plates. Further, the method includes selecting the lengths of the support tube and the capacitor plate such that the composite structure is insensitive to changes in temperature.

In accordance with another aspect of the present invention, a compensated composite structure includes a support structure, including a material having a coefficient of thermal expansion, and a capacitor plate, including a second material having a different coefficient of thermal expansion. The support structure includes two ends such that an insulator is coupled to one end. The capacitor plate is coupled to the insulator and surrounded by the support structure. The second material is also included in a flexure plate, which is disposed in substantially parallel relation to the capacitor plate. The flexure plate is coupled to the support structure, whereby the flexure plate and the capacitor plate define a distance. The distance varies in response to acceleration forces acting upon the flexure plate, thereby generating a capacitance signal.

One advantage of the present invention is that it generates a dynamic range and granularity sufficient for Inter-Continental Ballistic Missile (ICBM) usage. Moreover, the accelerometer consumes less power than current accelerometers, while dramatically improving reliability.

The inertial measurement unit system generates reliable angular and linear acceleration measurements. These measurements are accurate to the degree required by missile systems and will therefore provide a dramatic improvement in reliability and manufacturing costs.

Another advantage is that it is not substantially affected by changes in temperature or temperature gradients. The flexure configuration reduces the temperature sensitivity, thereby enhancing the signal-to-noise ratio.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which:

FIG. 4 illustrates an accelerometer system of FIG. 1 in accordance with another embodiment of the present invention;

FIG. 5 illustrates an equivalent capacitor system of FIG. 4; and

DETAILED DESCRIPTION OF THE INVENTION

The present invention is illustrated with respect to an aerospace system 10, particularly suited to the aerospace field. The present invention is, however, applicable to various other uses that may require accelerometers, such as any system requiring position and velocity measurements under extreme conditions, as will be understood by one skilled in the art.

Figure 1:
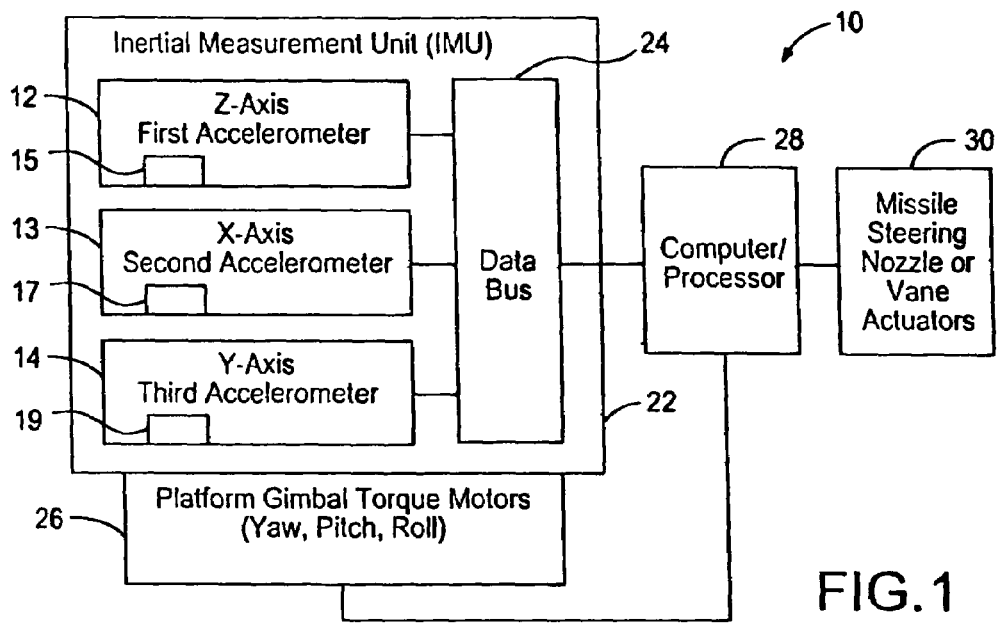
FIG. 1 illustrates an aerospace system including an accelerometer system in accordance with one embodiment of the present invention.

Referring to FIG. 1, the system 10, which is an aerospace, accelerometer system for controlling inertia, includes an inertial measurement unit 22 having three accelerometer gimbals/axes 12, 13, 14 (first, second, and third) respectively. Each of the gimbals includes compensated composite structure accelerometers 15, 17, 19, which will be discussed in detail later. The aerospace system 10 is merely an illustrative example of an accelerating object and is not meant to be limiting. For example, the present inertial measurement unit 22 could be implemented in any accelerating object to sense acceleration forces, including any type of vehicle or missile system, such as a Minuteman III missile system or a tactical missile system.

Further, the system 10 may be configured with compensated composite structures included in any of the following flexure plate devices: a flexured plate dual capacitance accelerometer, a variable capacitance bridge accelerometer, a capacitance acceleration derivative detector, a dual flexure plate angular accelerometer, a single plate capacitive acceleration derivative detector, a dual bridge flexure plate angular accelerometer, an angular and linear flexured plate accelerometer, a dual bridge angular and linear accelerometer, an accelerometer augmented leveling device, an accelerometer augmented precision compass, a quad flexured plate level detector, a flexured plate capacitive compass, a capacitive balance leveling device, an integrated capacitive bridge inertial measurement unit, an integrated flexure functions inertial measurement unit, and an extended accuracy flexured plate dual capacitance accelerometer. All of the aforementioned devices may include the compensated composite structure of the present invention described in detail regarding FIG. 2.

The illustrated aerospace system 10 includes the previously mentioned inertial measurement unit 22 and a data bus 24 and further includes gimbal and torque motors 26, a computer or processor 28, and missile steering nozzle or vane actuators 30.

The gimbals 12, 13 and 14, defining the z-, x-, y-axes, are coupled to the platform (including gimbal and torque motors 26 (yaw, pitch and roll motors)). The accelerometer gimbals 12, 13, 14 are also coupled to the data bus 24, which transfers information to the computer/processor 28. The processor 28 is coupled to the missile steering nozzle (or vane actuators) unit 30 and the gimbal torque motors 26.

All accelerometers are assumed to be on an inertial platform 26 utilizing generated signals to maintain an essentially zero rotation about all three axes. This control will be provided by the processor 28, which can compute signals and drive the motors on the platform 26 and select the required mode and provide the output data required by the system 10. The platform 26 may be a gimbal or alternate inertial platform design known in the art. The system 10 utilizes the generated signals from the accelerometers to control the platform position to maintain a near zero rotation. The platform 26 may also include gimbal torque motors controlling the yaw, pitch, and roll gimbals, z-, x-, and y-axis gimbals 12, 13, 14.

In one embodiment of the present invention, such as when the system 10 includes a leveling device, each axis gimbal 12, 13, 14 may include multiple accelerometers and an angular readout device to detect the current angular position with respect to the platform 26. The angular readout device may be an electrical resolver, an optical encoder, a mechanical interface or any of a wide range of devices capable of determining the angle to the accuracy required by the system 10.

The platform 26 may also include, mounted as an integral part, a gyrocompass, which will generate an output indicating the magnitude of the velocity vector through the xz-plane. When the plane of the platform 26 is level and local gravity is perpendicular thereto, the gyrocompass may be rotated 360° in order to establish the east-west direction of the rotation of the earth. This reference may be utilized for initial conditions for the inertial measurement unit gimbal readouts.

Figure 2:
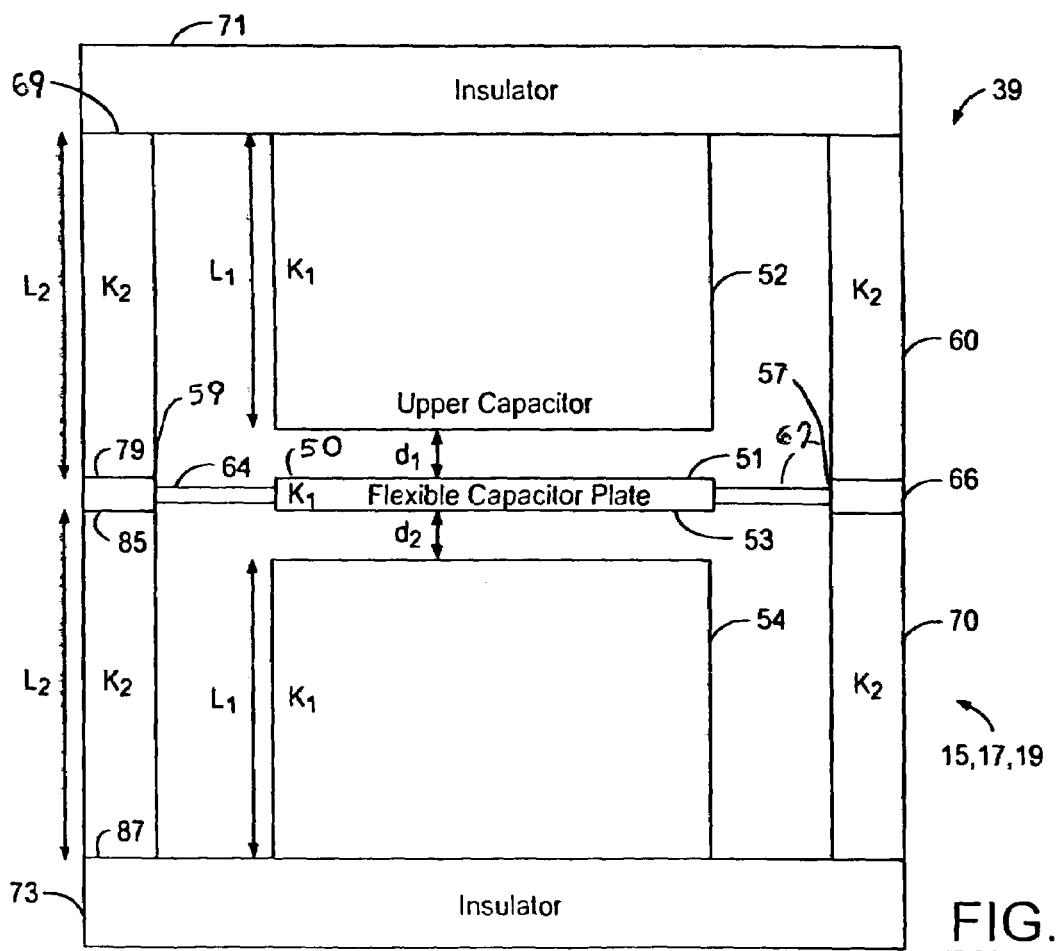
FIG. 2 illustrates a cutaway view of the composite structure of the accelerometer system of FIG. 1.

The composite structure design is included as one embodiment of the present invention and illustrated in FIG. 2 with dimensions for clarity. The composite structure 39 includes an upper capacitor plate 52 (first plate), a lower capacitor plate 54 (second plate), and a flexure plate 50 (central plate) positioned between the upper and lower plates. To maintain the capacitances between the central plate 50 and to maintain the upper and lower plates 52, 54 insensitive to changes in temperature, a constant ratio A/d is maintained where A is the area of the plates and d is separation between the central plate 50 and either the upper or lower plate.

FIG. 2 illustrates a cross sectional view of the composite structure 39 including an upper cylinder support tube 60 (support structure), a lower cylinder support tube 70, the flexible central capacitor plate 50, the upper capacitor plate 52, and the lower capacitor plate 54. Important to note is that an alternate embodiment of the present invention includes only a single plate or a multiple upper plate configuration.

The central flexure plate 50 is coupled to the cylinders 60, 70 via support flexures 62, 64 connected to a support ring 66, which may be the same material as the central flexure plate 50. One material that functions well for the purposes of the present invention is elgiloy®; however numerous other robust substances may also be used in accordance with the present invention. The present embodiment includes concentric capacitor plates 52, 54, support ring 66, support flexures 62, 64, however this is merely one embodiment of the present invention.

The upper and lower plates 52, 54 may include a same material or different materials. One embodiment includes this material having a coefficient of thermal expansion equal to $K_1$ (second material). The plates 52, 54 are capacitor plates surrounded by the support tubes 60, 70.

The upper and lower cylindrical support tubes 60, 70 include another material with a coefficient of thermal expansion equal to $K_2$ (first material). The support tubes 60, 70 are mounted on insulators 71, 73 a distance from the capacitor plates 52, 54. The first support tube 60 (upper) or first support structure includes a first end 69 and a second end 79. Coupled to the first end 69 is the first insulator 71, coupled to the second end 79 is the flexure plate 50. The second support tube 70 (lower) or second support structure includes a first end 87 and a second end 85. Coupled to the first end 87 is the second insulator 73, coupled to the second end 85 is the flexure plate 50.

As temperature changes, $\Delta T$, the flexure plate material changes height by an amount $\Delta L_1 = K_1 L_1 \Delta T$. The radius (R) of the flexure plate 50 changes as a function of $\Delta R = K_1 R \Delta T$. The ratio A/d is held constant, i.e. $\pi(R+\Delta R)^2/(d+\Delta d) = \pi R^2/d$. Canceling the factor $\pi$, multiplying out both sides, and arranging terms generates: $2R \Delta R \, d + (\Delta R)^2 \, d = R^2 \, \Delta d$. Ignoring the '$(\Delta R)^2 d$' term as very small, $\Delta d/d = 2 \Delta R/R$. In other words, the effective coefficient of vertical expansion is twice as large as the horizontal coefficient of expansion. This can be arranged by choosing appropriate lengths $L_1$ and $L_2$. Important to note is that $\Delta d/d = \Delta T(K_2 L_2 - K_1 L_1)/(L_2 - L_1) = 2 \Delta R/R = 2 K_1 R \Delta T/R$. Canceling R and $\Delta T$ and rearranging, $K_2/K_1 = (2L_2 - L_1)/L_2$. Since $L_2$ is greater than $L_1$, this equation will be satisfied if $K_2$ is greater than $K_1$.

By choosing a material for the support tubes 60, 70 where the coefficient of expansion is larger than that of the material of the capacitor plates 52, 54, and selecting the lengths $L_2$ and $L_1$ properly, a capacitor structure that is insensitive to changes in temperature may be constructed in accordance with the present invention.

Figure 3:
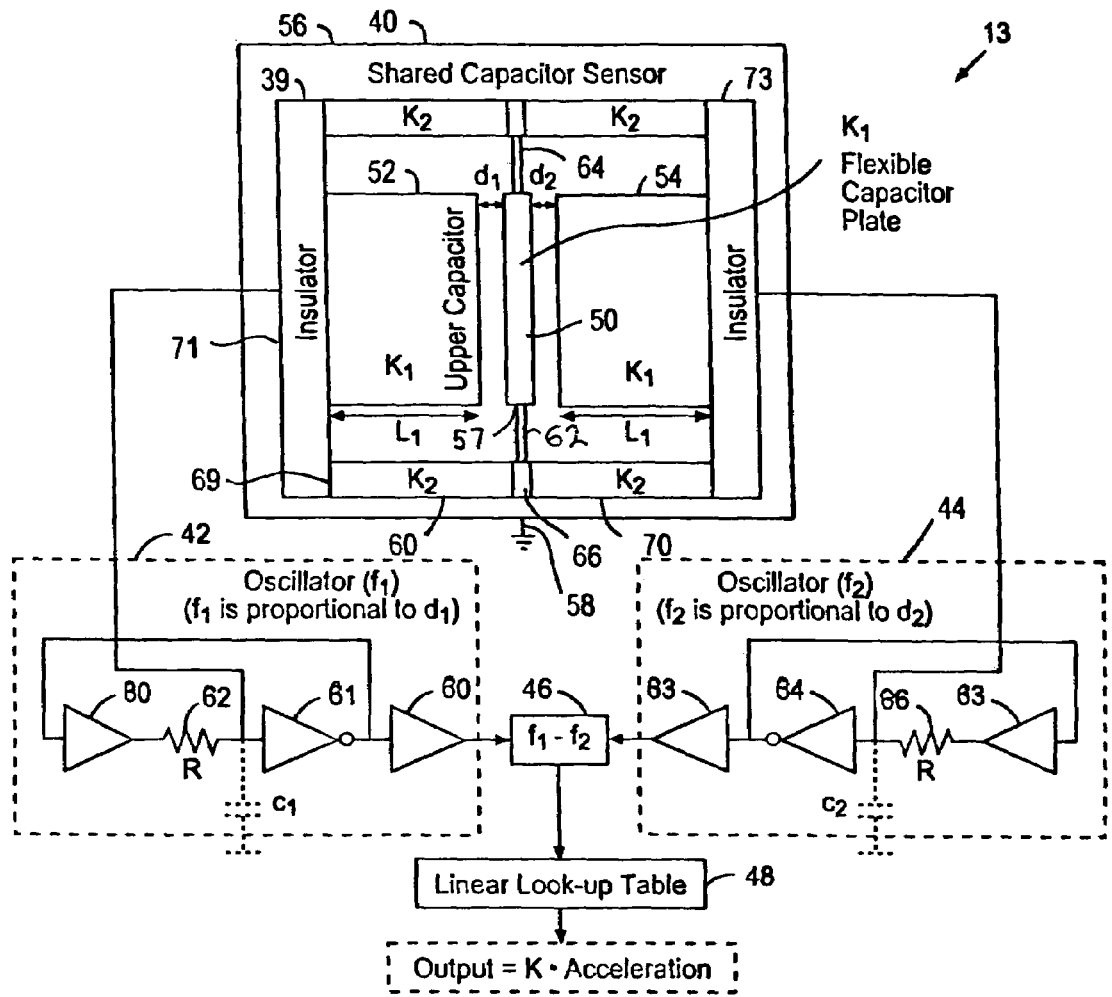
FIG. 3 illustrates an accelerometer system of FIG. 1 in accordance with another embodiment of the present invention.

Referring to FIGS. 2 and 3, an example of a possible configuration for the accelerometer 15 is included as an illustrative example of the three accelerometers 15, 17, 19. The accelerometer 15 is part of an inertial measurement unit 22 (IMU), as was previously discussed. The inertial measurement unit 22 includes a shared capacitor sensor 40, two oscillators 42, 44, a frequency subtraction device 46, and a Linear Lookup Table (LLT) or linearizer 48.

The shared capacitor sensor 40 includes a single flexure plate 50, two parallel capacitor plates 52, 54, and a metal housing structure 56. The shared capacitor sensor 40 generates capacitance signals in response to acceleration of the aeronautical system 10, as will be discussed later.

The flexure plate 50 is positioned between the two capacitor plates 52, 54 such that the first fixed plate 52 is a first distance ($d_1$) from a first side 51, and the second capacitor plate 54 is a second distance ($d_2$) from a second side 53 of the flexure plate 50. The flexure plate 50 is affixed to the metal housing structure 56 through at least a portion of at least one edge 57 of the flexure plate 50, which is coupled to both ends of the flexure plate 50 and is also coupled to a ground 58. The present invention, however, includes the flexure plate 50 coupled at two edges 57, 59 for a square embodiment of the plate 50.

In the present embodiment, the flexure plate 50 is circular and coupled to the housing 56 at only one edge 57. However, numerous other shapes are included, as will be understood by one skilled in the art. The flexure plate is rigidly fixed to the metal housing structure through almost any manner known in the art. Resultantly, all the system flexure is generated within the flexure plate 50. This generally increases reliability and robustness of the system 10. This, however, generates a non-linear output from the flexure plate 50, which will be discussed regarding the linear lookup table linearizer 48.

A gas or vacuum environment is enclosed within the sensor 40 through the metal housing structure 56 such that there is no interference with the movement of the flexure plate 50 other than the acceleration of the system 10 along a perpendicular axis. During acceleration, the flexure plate 50 flexes according to the reaction force of Newton's second law of motion, force=mass x acceleration (F=ma), causing the distance between the flexure plate 50 and the capacitor plates 52, 54 to vary, thus creating the two variable capacitors, one on each side of the flexure plate 50.

The combination of the first capacitor plate 52 and the flexure plate 50 forms a first parallel plate capacitor, and the combination of the second capacitor plate 54 and the flexure plate 50 forms the second parallel plate capacitor. The equivalent capacitor for the first parallel plate capacitor is illustrated in broken lines as $C_1$, and the equivalent capacitor for the second parallel plate capacitor is illustrated in broken lines as $C_2$.

The capacitance of the parallel plate capacitors is determined by $C \cong (\epsilon_0 A)/d$, where $\epsilon_0$ is the permittivity constant, A is the area of a capacitor plate 52 or 54 (if 1 is the length of one side and the cross section of the plate is square, then $A=1^2$) and d is the effective distance between the flexure plate 50 and one of the capacitor plates 52, 54.

The first capacitor plate 52 is coupled to the metal housing structure 56 and positioned a first distance ($d_1$) from the flexure plate 50. The first capacitor plate 52 and the flexure plate 50 form a first capacitor whose operation is also governed by the equation $C \cong (\epsilon_0 A)/d$. The capacitance of the first capacitor plate 52 responds to movement of the flexure plate 50 when $d_1$ either increases or decreases, thereby generating a first capacitance signal.

The second capacitor plate 54 is also coupled to the metal housing structure 56 and positioned a first distance ($d_1$) from the flexure plate 50. The second capacitor plate 54 and the flexure plate 50 form a second capacitor whose operation is governed by the equation $C \cong (\epsilon_0 A)/d$. The second capacitor plate 54 responds to movement of the flexure plate 50 when $d_2$ either increases or decreases, thereby generating a second capacitance signal.

The distances ($d_1$ and $d_2$) between the flexure plate 50 and the capacitor plates 52, 54 are a function of acceleration and are proportional or equal when the system 10 is at rest. Each capacitor plate 52, 54 is connected to a respective oscillator 42, 44, which generates the capacitance necessary for predictable oscillation.

The first capacitor plate 52 is coupled to the first oscillator 42, and the second capacitor plate 54 is coupled to the second oscillator 44. The two oscillators 42, 44 are coupled to a frequency subtraction device 46, and the frequency subtraction device 46 is coupled to the linear lookup table 48, which is coupled to a processor 28 (missile operations processor). The processor 28 is coupled to an actuator 30, and to various system components, as well as thrusters and attitude control devices.

The oscillators 42, 44 are ideally precision designs utilizing GaAs or similar material. The oscillators 42, 44 are also mounted on the metal housing structure 56 in the present embodiment.

The embodied first oscillator 42 includes components well known in the art. Although the embodied oscillator is a common oscillator type, one skilled in the art will realize that numerous other types of oscillators will also be adaptable for the present invention. The various components include, but are not limited to, two buffers, 80, an inverter 81, and at least one resistor 82. The first oscillator 42 receives the capacitance signal from the first capacitor plate 52 and generates therefrom a frequency signal ($f_1$), which is inversely proportional to $d_1$.

The second oscillator 44 receives the capacitance signal from the second capacitor plate capacitor and generates therefrom a second frequency signal ($f_2$), which is inversely proportional to $d_2$. The embodied oscillator 44 is similar to the first oscillator 42 and also includes a set of buffers 83, an inverter 84, and at least one resistor 86.

The frequencies ($f_1$ and $f_2$) are functions of the distances ($d_1$ and $d_2$) respectively. As the flexure plate 50 flexes, one capacitor increases and the other decreases, thereby causing one oscillator 42 to increase output frequency and the other oscillator 44 to decrease output frequency.

The frequency subtraction device 46 receives the oscillator signals ($f_1$ and $f_2$) and generates the difference thereof, i.e., $f_1-f_2$. Important to note is that the polarities of both $f_1$ and $f_2$ are determined before this difference is calculated. A resultant frequency signal is generated from the frequency subtraction device 46.

A linearizer 48 or linear lookup table receives the overall frequency signal. The linearizer 48 compensates for both the nonlinear function generated from the frequency subtraction device 46 and any manufacturing anomalies, as will be understood by one skilled in the art. The linearizer 48 value is established in manufacturing through taking large samples of performance curves, as will be understood by one skilled in the art. The linearizer 48 output is a digital word whose magnitude is proportional to the acceleration of the system 10 in either direction along an axis perpendicular to the flexure plate 50.

Numerous alternate linearizers are also included in the present embodiment whereby a substantially linear function can be generated by compensating for nonlinear functions, for example, in the digital domain, a digital linearizer is included. The output of the linearizer 48 is an acceleration signal multiplied by a constant (k).

Statistical filtering of the linearized data somewhere significantly above the maximum flexure frequency also occurs in either the linearizer 48 or the processor 28 to reduce the overall noise impact on the system 10.

The processor 28 receives the output signals and generates a processor signal and response thereto. The processor 28 is embodied as a typical missile or airplane processor, as is familiar in the art.

The processor 28 accepts the output of each accelerometer pair and applies the compensation and calibration corrections derived from manufacturing and the earth rate calibration scheme. The actuator, here embodied as missile steering nozzle or vane actuators 30 receives processor signals and activates system components (e.g., object control devices) in response thereto. System components include for example, thrusters or attitude control devices.

Referring to FIGS. 4 and 5, a bridge accelerometer in accordance with FIG. 1 is illustrated. Each bridge accelerometer or variable capacitance bridge accelerometer within the integrated accelerometer system 10 is a single axis accelerometer that generates a robust wide dynamic range of performance.

The accelerometer will be described as an illustrative example of the accelerometers in this embodiment. The accelerometer is part of the inertial measurement unit 22 and includes a housing 76, a flexured plate section 65, a rigid plate section 67, a ground 78, an AC source 93, a differential amplifier 95, a demodulator 97, an analog filter 99, an analog-to-digital converter 100, and a digital linearizer and filter 102.

The housing 76 or metal housing structure encloses four capacitors, which will be discussed later. A gas or vacuum environment is also enclosed therein such that there is no interference with the movement of the flexure plate 50 other than the acceleration of the system 10 along a perpendicular axis.

The flexured plate section 65 includes a single flexure plate 50 and two parallel capacitor plates 52, 54. The rigid plate section 67 includes a rigid plate 90 and two capacitor plates 92, 94. The two sections are electrically isolated and enclosed in a metal housing structure 76.

In the present embodiment, the flexure plate 50 is coupled to the support structure 60 at only one edge 57. Numerous other attachment points are, however, included, as will be understood by one skilled in the art. The flexure plate 50 includes a first side 51, a second side 53 and a common edge 57.

The flexure plate 50 is positioned between the first and second capacitor plates 52, 54 such that the first capacitor plate 52 is a first distance ($d_1$) from the first side 51 and the second capacitor plate 54 is a second distance ($d_2$) from the second side 53 of the flexure plate 50. The flexure plate 50 is affixed to the support structure 60 through at least a portion of the common edge 57 of the flexure plate 50, which is also coupled to a ground 78.

The composite structure 39 is rigidly fixed to the metal housing structure 76 through almost any manner known in the art. Resultantly, all the system flexure is generated within the flexure plate 50 along a flex axis (for the first accelerometer 15 this is a first flex axis, for the second accelerometer 14, this is the second flex axis). This generally increases reliability and robustness of the system 10. This, however, generates a non-linear output from the flexure plate 50, which will be discussed regarding the linearizer 102.

The combination of the first capacitor plate 52 and the flexure plate 50 forms a first parallel plate capacitor, and the combination of the second capacitor plate 54 and the flexure plate 50 forms the second parallel plate capacitor. The equivalent capacitor for the first parallel plate capacitor is illustrated in FIG. 5 in broken lines as $C_1$, and the equivalent capacitor for the second parallel plate capacitor is illustrated in broken lines as $C_2$.

The capacitance of the parallel plate capacitors is determined by the following: $C \cong (\epsilon_0 A)/d$, where $\epsilon_0$ is the permittivity constant, A is the area of a capacitor plate 52 or 54, and d is the effective distance between the flexure plate 50 and one of the capacitor plates 52, 54.

The first capacitor plate 52 is coupled to the metal housing structure 76 and positioned a first distance ($d_1$) from the flexure plate 50. The first capacitor plate 52 and the flexure plate 50 form a first capacitor whose operation is also governed by the equation $C \cong (\epsilon_0 A)/d$. The first capacitor plate 52 responds to movement of the flexure plate 50 when $d_1$ either increases or decreases, thereby generating a first capacitance signal.

The second capacitor plate 54 is also coupled to the metal housing structure 76 and positioned a second distance ($d_2$) from the flexure plate 50. The second capacitor plate 54 and the flexure plate 50 form a second capacitor whose operation is governed by the equation $C \cong (\epsilon_0 A)/d$. The second capacitor plate 54 responds to movement of the flexure plate 50 when $d_2$ either increases or decreases, thereby generating a second capacitance signal.

The distances ($d_1$ and $d_2$) between the flexure plate 50 and the capacitor plates 52, 54 are a function of acceleration and are proportional or equal when the system 10 is at rest.

During acceleration, the flexure plate 50 flexes according to the reaction force of Newton's second law of motion, force=mass×acceleration (F=ma), causing the distance between the flexure plate 50 and the capacitor plates 52, 54 to vary, thus creating the two variable capacitors $C_1$, $C_2$, one on each side of the flexure plate 50.

For the rigid plate section 67, which is insulated from the flexured plate section 65, the rigid plate 90 is positioned between the third-capacitor plate 92 and fourth capacitor plate 94 such that the third capacitor plate 92 is a third distance ($d_3$) from a first side 96 and the fourth capacitor plate 94 is a fourth distance ($d_4$) from a second side 98 of the rigid plate 90. The rigid plate 90 is coupled to an insulator 101 through at least a portion of at least one common edge of the first side 96 and the second side 98 of the rigid plate 90, and the insulator 101 is affixed to the metal housing structure 76. The third and fourth capacitor plates 92, 94 are coupled to the housing 76.

In the present embodiment, the rigid plate 90 is coupled to the housing 76 through an insulator at only one edge 103. However, numerous other attachment points are included, as will be understood by one skilled in the art.

The combination of the third capacitor plate 92 and the rigid plate 90 forms a third parallel plate capacitor, and the combination of the fourth capacitor plate 94 and the rigid plate 90 forms the fourth parallel plate capacitor. The equivalent capacitor for the third parallel plate capacitor is illustrated in broken lines in FIG. 5 as $C_3$, and the equivalent capacitor for the fourth parallel plate capacitor is illustrated in broken lines as $C_4$.

The first and second capacitors are formed on each side of the flexure plate 50 and the third and fourth capacitors are formed on either side of the rigid plate 90. The four capacitors are electrically connected to form a bridge. The fixed capacitors (third and fourth) and rigid plate 90 are isolated from the flexured plate 50 and flexured plate capacitors (first and second). All capacitors are designed to be as nearly equal as possible when at rest.

The distance between the flexure plate 50 and the rigid plate 90 is a function of acceleration. The center of each bridge side (ED and BF in FIGS. 4 and 5) is monitored to detect the differential amplitude. As the flexure plate 50 flexes in response to acceleration, one capacitor increases and the other decreases, thereby increasing the bridge voltage on one side and decreasing bridge voltage on the other.

The bridge is excited with an AC source 93 at one end (A) and grounded at the other end (C). The ground 78 is coupled to the flexure plate 50 and the AC source 93 is coupled to the rigid plate 90. The two capacitive legs (ADEC) and (ABFC) of the bridge produce two voltage dividers, each of which provides a terminal (ED, BF), illustrated in FIG. 5, to measure the resulting voltage.

The bridge configuration reduces the temperature sensitivity and the AC excitation allowing narrow band analog filtering, both of which enhance the signal-to-noise ratio. The bridge circuitry utilizes GaAs or high speed CMOS, as the accuracy required for performance will require low propagation delays. In one embodiment, the bridge circuitry is mounted on a heated housing structure. In addition, the entire system includes a precision heating device (not illustrated) and sufficient mass to reduce gradients in the bridge in one embodiment.

The voltage phase gives direct indication of the direction of acceleration. This output is gain adjusted if required in the differential amplifier 95, and received in the demodulator 97, which rectifies the waveform as a function of the reference excitation phase from the AC source 93. The resulting waveform is then filtered in the analog domain in the analog filter 99 and received in an analog-to-digital converter 100 where the data becomes a digital word.

The digital word is then filtered and linearized in the digital linearizer and filter 102 for manufacturing and flexure non-uniformities. This output is a digital word having a magnitude proportional to the acceleration of the system in either direction along the perpendicular axis.

In other words, the linearizer 102 receives the overall digital word signal. The linearizer 102 compensates for both the nonlinear function generated from the analog-to-digital converter 100 and any manufacturing anomalies, as will be understood by one skilled in the art. The linearizer 102 value is established in manufacturing through taking large samples of performance curves, as will be understood by one skilled in the art. The linearizer 102 output is a digital word whose magnitude is proportional to the acceleration of the system 10 in either direction along an axis perpendicular to the flexure plate 50.

Numerous alternate linearizers are also included in the present embodiment whereby a substantially linear function can be generated by compensating for nonlinear functions, for example, in the digital domain, a digital linearizer is included. The output of the linearizer 102 is an acceleration signal multiplied by a constant (k).

Statistical filtering of the linearized data somewhere significantly above the maximum flexure frequency also occurs in either the digital linearizer and filter 102 or the processor 28 to reduce the overall noise impact on the system 10. The compensation for the non-linearity of the flexure structure and overall transport error is compensated for by the linearizer and filter 102 whose values are established in manufacturing through sampling performance curves.

The processor 28 receives the acceleration signal multiplied by the constant and generates a computer signal and response thereto. The processor 28 is embodied as a typical missile or airplane computer, as is familiar in the art.

The missile steering nozzle or vane actuators 30 receive the computer signal and activate the gimbal torque motors 26 or object control devices in response thereto.

Figure 6:
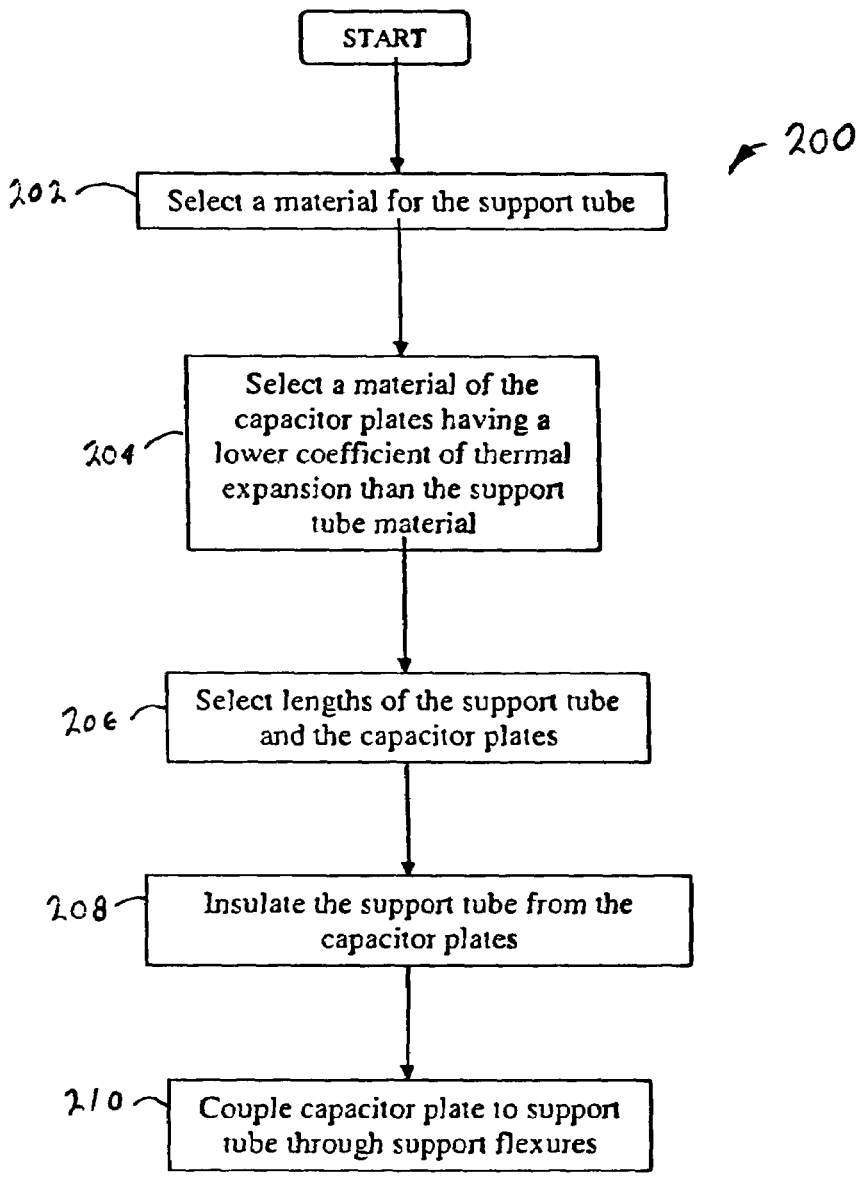
FIG. 6 illustrates a block diagram of a method for constructing a compensated composite structure in accordance with another embodiment of the present invention.

Referring to FIG. 6, a block diagram 200 of a method for constructing a compensated composite structure, in accordance with another embodiment of the present invention, is illustrated. Logic starts in operation block 202 where a material is selected for the support tube having a suitable coefficient of thermal expansion.

In operation block 204, a material is selected for the capacitor plates having a lower coefficient of thermal than the material chosen for the support tube.

In operation block 206, lengths of the support tube and the capacitor plates are selected such that temperature change of the composite structure results in effective vertical coefficient expansion of the aforementioned components twice as large as effective horizontal coefficient of expansion.

In operation block 208, the support tube surrounds the upper capacitor plate and is coupled to an insulator. The upper capacitor plate is also coupled to the insulator such that it does not contact the support tube.

In operation block 210, the flexure capacitor plate is coupled to the support tube through support flexures and is positioned parallel to a surface of the upper capacitor plate.

In operation, a method for constructing a compensated composite structure includes selecting a first material for a capacitor plate and a flexure plate disposed in parallel relation to the capacitor plate, the material includes a first coefficient of thermal expansion; determining a length of the capacitor plate; selecting a second material for a support structure for the capacitor plate and the flexure plate, the second material includes a second coefficient of thermal expansion larger than the coefficient of thermal expansion; determining a length for the support structure larger than the length of the capacitor plate; insulating the capacitor plate from the support structure; and coupling the support structure to the flexure plate.

From the foregoing, it can be seen that there has been brought to the art a new and improved accelerometer system. It is to be understood that the preceding description of the preferred embodiment is merely illustrative of some of the many specific embodiments that represent applications of the principles of the present invention. For example, a vehicle, such as an airplane, spacecraft, or automobile could include the present invention for acceleration detection and control. Numerous and other arrangements would be evident to those skilled in the art without departing from the scope of the invention as defined by the following claims.

What is claimed is:

1. A compensated composite structure comprising:
a first support structure comprising a first material comprising a first coefficient of thermal expansion, said first support structure comprising a first end and a second end;
a first insulator coupled to said first end of said first support structure;

a first capacitor plate comprising a second material comprising a second coefficient of thermal expansion, said first capacitor plate coupled to said first insulator and surrounded by said first support structure; and a flexure plate comprising said second material, said flexure plate disposed in a substantially parallel relation to said first capacitor plate, said flexure plate rigidly fixed to said second end of said first support structure whereby all flexure generated within said composite structure is generated within said flexure plate, said flexure plate and said first capacitor plate defining a first distance, wherein said first distance varies in response to acceleration forces acting upon said flexure plate thereby generating at least one capacitance signal.

2. The system of claim 1 further comprising a second support structure comprising said first material, said second support structure comprising a first end and a second end, wherein said flexure plate is coupled to said second end of said second support structure.

3. The system of claim 2 further comprising a second insulator coupled to said first end of said second support structure.

4. The system of claim 3 further comprising a second capacitor plate comprising said second material, said second capacitor plate coupled to said second insulator and surrounded by said second support structure.

5. The system of claim 4, wherein said second capacitor plate is spaced apart from and in parallel relation to said first capacitor plate.

6. The system of claim 2, wherein said flexure plate is coupled to said first support structure and said second support structure through support flexures.

7. The system of claim 1, wherein said first coefficient of thermal expansion is greater than said second coefficient of thermal expansion.

8. The system of claim 1, wherein a length of said first support structure extending from said first insulator is larger than a length of said first capacitor plate extending from said first insulator.

9. The system of claim 1 further comprising:

a second support structure comprising said first material, said second support structure comprising a first end and a second end, wherein said flexure plate is coupled to said second end of said second support structure;

a second insulator coupled to said first end of said second support structure; and a second capacitor plate coupled to said second insulator and surrounded by said second support structure, wherein said flexure plate is disposed in substantially parallel relation to said second capacitor plate, said flexure plate rigidly fixed to said second end of said second support structure whereby all flexure generated within said composite structure is generated within said flexure plate, said flexure plate and said second capacitor plate defining a second distance, wherein said second distance varies in response to acceleration forces acting upon said flexure plate thereby generating a second capacitance signal.

10. The system of claim 9 further comprising a first oscillator receiving said at least one capacitance signal and generating a first frequency signal in response thereto.

11. The system of claim 10 further comprising a second oscillator receiving said second capacitance signal and generating a second frequency signal in response thereto; and a frequency subtraction device subtracting said second frequency signal from said first frequency signal and generating therefrom an overall frequency signal.

12. The system of claim 11 further comprising a linearizer receiving said overall frequency signal and generating therefrom a linearized acceleration signal.

13. The system of claim 12 further comprising an actuator adapted to activate a system component in response to said linearized acceleration signal, wherein said system component comprises a thruster or an attitude control device.

14. An accelerometer system comprising:

a housing;

a first support structure enclosed within said housing and comprising a first material comprising a first coefficient of thermal expansion, said first support structure comprising a first end and a second end, a first insulator coupled to said first end of said first support structure;

a first capacitor plate comprising a second material comprising a second coefficient of thermal expansion, said first capacitor plate coupled to said first insulator and surrounded by said first support structure, a second support structure comprising said first material, said second support structure comprising a first end and a second end, a second insulator coupled to said first end of said second support structure, a second capacitor plate coupled to said second insulator and surrounded by said second support structure, a flexure plate comprising said second material and disposed between and in substantially parallel relation to said first capacitor plate and said second capacitor plate, said flexure plate rigidly fixed to said second end of said first support structure and said second end of said second support structure whereby all flexure generated within said accelerometer system is generated within said flexure plate, said flexure plate and said first capacitor plate defining a first distance wherein said first distance varies in response to acceleration forces acting upon said flexure plate thereby generating a first capacitance signal, said flexure plate and said second capacitor plate defining a second distance wherein said second distance varies in response to acceleration forces acting upon said flexure plate thereby generating a second capacitance signal.

15. The system of claim 14, wherein said flexure plate is coupled to said first support structure and said second support structure through support flexures.

16. The system of claim 14, wherein said first coefficient of thermal expansion is greater than said second coefficient of thermal expansion.

17. The system of claim 14, wherein a length of said first support structure extending from said first insulator is larger than a length of said first capacitor plate extending from said first insulator.

18. A system for controlling inertia of an object comprising:

an inertial platform;

an inertial measurement unit coupled to said inertial platform, said inertial measurement unit comprising a first gimbal, whereby a first flexure accelerometer is coupled to said first gimbal, said first flexure accelerometer comprising a first support structure comprising a first material comprising a first coefficient of thermal expansion, said first support structure comprising a first end and a second end, a first insulator coupled to said first end of said first support structure;

a first capacitor plate comprising a second material comprising a second coefficient of thermal expansion, said first capacitor plate coupled to said first insulator and surrounded by said first support structure, a second support structure comprising said first material, said second support structure comprising a first end and a second end, a second insulator coupled to said first end of said second support structure, a second capacitor plate coupled to said second insulator and surrounded by said second support structure, a flexure plate comprising said second material and disposed between and in substantially parallel relation to said first capacitor plate and said second capacitor plate, said flexure plate rigidly fixed to said second end of said first support structure and said second end of said second support structure whereby all flexure generated within said system is generated within said flexure plate, said flexure plate and said first capacitor plate defining a first distance wherein said first distance varies in response to acceleration forces acting upon said flexure plate thereby generating a first capacitance signal, said flexure plate and said second capacitor plate defining a second distance wherein said second distance varies in response to acceleration forces acting upon said flexure plate thereby generating a second capacitance signal, a processor leveling said platform perpendicular to a local gravity vector as a function of said first capacitance signal and said second capacitance signal.

19. The system of claim 18, wherein said flexure plate is coupled to said first support structure and said second support structure through support flexures.

20. The system of claim 18, wherein said first coefficient of thermal expansion is greater than said second coefficient of thermal expansion.

21. The system of claim 18, wherein a length of said first support structure extending from said first insulator is larger than a length of said first capacitor plate extending from said first insulator.

22. An accelerometer comprising:

a cylindrical support structure comprising a first material comprising a first coefficient of thermal expansion;

a first capacitor plate comprising a second material comprising a second coefficient of thermal expansion, wherein said first coefficient of thermal expansion is greater than said second coefficient of thermal expansion, said first capacitor plate surrounded by and thermally insulated from said support structure;

a second capacitor plate positioned a distance from and in parallel relation to said first capacitor plate, said second capacitor plate comprising said second material surrounded by and thermally isolated from said support structure;

a flexure plate comprising said second material and disposed between and in substantially parallel relation to said first capacitor plate and said second capacitor plate, said flexure plate rigidly fixed to said support structure through support flexures whereby all flexure generated within said accelerometer is generated within said flexure plate, said flexure plate and said first capacitor plate defining a first distance wherein said first distance varies in response to acceleration forces acting upon said flexure plate thereby generating a first capacitance signal, said flexure plate and said second capacitor plate defining a second distance wherein said second distance varies in response to acceleration forces acting upon said flexure plate thereby generating a second capacitance signal.

23. The system of claim 22 further comprising a first oscillator receiving said first capacitance signal and generating a first frequency signal in response thereto.

24. The system of claim 23 further comprising a second oscillator receiving said second capacitance signal and generating a second frequency signal in response thereto; and a frequency subtraction device subtracting said second frequency signal from said first frequency signal and generating therefrom an overall frequency signal.

25. The system of claim 24 further comprising a linearizer receiving said overall frequency signal and generating therefrom a linearized acceleration signal.

26. The system of claim 25 further comprising an actuator adapted to activate a system component in response to said linearized acceleration signal, wherein said system component comprises a thruster or an attitude control device.

27. The system of claim 22 further comprising a support ring fixedly attached to said support structure, whereby said flexure plate is rigidly fixed to said support structure through said support ring.

28. A method for constructing a compensated composite structure comprising:

selecting a first material for a capacitor plate and a flexure plate disposed in parallel relation to said capacitor plate, said material comprising a first coefficient of thermal expansion;

determining a length of said capacitor plate;

selecting a second material for a support structure for said capacitor plate and said flexure plate, said second material comprising a second coefficient of thermal expansion larger than said first coefficient of thermal expansion;

determining a length for said support structure larger than said length of said capacitor plate;

insulating said capacitor plate from said support structure; and rigidly fixing said support structure to said flexure plate whereby all flexure generated within said composite structure is generated within said flexure plate.

29. The method of claim 28, wherein determining said length of said capacitor plate and determining said length for said support structure further comprise determining a length of said capacitor plate and a length of said support structure such that the composite structure is insensitive to changes in temperature.

30. The method of claim 28, wherein determining said length of said capacitor plate and determining said length for said support structure further comprise determining a length of said capacitor plate and a length of said support structure such that an effective coefficient of vertical expansion of the composite structure is twice as large as a horizontal coefficient of thermal expansion thereof.

31. A method for compensating for temperature effects on a composite structure, including a support tube rigidly fixed to a flexure plate through support flexures and enclosing two capacitor plates wherein substantially all flexure generated within said composite structure is generated within said flexure plate, which are disposed parallel to the flexure plate, comprising:

selecting a material for the support tube whereby a coefficient of expansion of the support tube is larger than that of a material of the capacitor plates and the flexure plate; and selecting lengths of the support tube and the capacitor plates such that the composite structure is insensitive to changes in temperature.

32. The method of claim 31, wherein selecting said lengths further comprises selecting lengths of said capacitor plates such that an effective coefficient of vertical expansion of said capacitor plates is twice as large as a horizontal coefficient of thermal expansion thereof.

* * * * *